United States Patent
Lai

(10) Patent No.: US 10,104,380 B2
(45) Date of Patent: *Oct. 16, 2018

(54) ENCODING AND DECODING METHODS AND APPARATUSES

(71) Applicant: HUAWEI TECHNOLOGIES CO., LTD., Shenzhen, Guangdong (CN)

(72) Inventor: Changcai Lai, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,677

(22) Filed: Jun. 7, 2017

(65) Prior Publication Data
US 2017/0272760 A1    Sep. 21, 2017

Related U.S. Application Data

(63) Continuation of application No. 14/142,437, filed on Dec. 27, 2013, now Pat. No. 9,769,474, which is a
(Continued)

(30) Foreign Application Priority Data

Jan. 19, 2012 (CN) .......................... 2012 1 0018036

(51) Int. Cl.
*H04N 19/159* (2014.01)
*H04N 19/593* (2014.01)
(Continued)

(52) U.S. Cl.
CPC .......... *H04N 19/159* (2014.11); *H04N 19/11* (2014.11); *H04N 19/176* (2014.11); *H04N 19/463* (2014.11); *H04N 19/593* (2014.11)

(58) Field of Classification Search
None
See application file for complete search history.

(56) References Cited

U.S. PATENT DOCUMENTS

| 5,604,602 | A  | 2/1997 | Guillotel et al. |
| 7,751,478 | B2 | 7/2010 | Kim et al. |

(Continued)

FOREIGN PATENT DOCUMENTS

| CN | 1615020 A | 5/2005 |
| CN | 1809168 A | 7/2006 |

(Continued)

OTHER PUBLICATIONS

Toru Kumakura et al., "Fixing the number of mpm candidates", Joint Collaborative Team on Video Coding (JCT-VC) of ITU-T SG16 WP3 and ISO/IEC JTC1/SC29/WG11, 6th Meeting, Torino, IT, Jul. 14-22, 2011, Document JCTVC-7340, 8 pages.

(Continued)

*Primary Examiner* — Mohammad J Rahman
(74) *Attorney, Agent, or Firm* — James Harrison

(57) ABSTRACT

The present disclosure provides a method for encoding an intra-frame prediction mode, including: obtaining an intra-frame prediction mode of a current intra-frame encoding block from a preset prediction mode set; obtaining reference prediction modes of the current intra-frame encoding block, where the reference prediction modes are intra-frame prediction modes of available adjacent blocks of the current intra-frame encoding block or prediction modes in a preset backup reference mode set; writing a first flag bit into a code stream according to the reference prediction modes and the intra-frame prediction mode; and, when the intra-frame prediction mode of the encoding block is different from all the reference prediction modes, obtaining a prediction mode encoding value according to a size relationship between the value of the intra-frame prediction mode and values of the
(Continued)

reference prediction modes, and encoding the prediction mode encoding value.

39 Claims, 4 Drawing Sheets

Related U.S. Application Data continuation of application No. PCT/CN2013/070778, filed on Jan. 21, 2013.

(51) Int. Cl.
  *H04N 19/11* (2014.01)
  *H04N 19/176* (2014.01)
  *H04N 19/463* (2014.01)

(56) References Cited

U.S. PATENT DOCUMENTS

| | | | |
|---|---|---|---|
| 8,879,637 | B2 | 11/2014 | Park et al. |
| 9,088,796 | B2 | 7/2015 | Misra et al. |
| 9,426,471 | B2 | 8/2016 | Park et al. |
| 2003/0206594 | A1 | 11/2003 | Zhou |
| 2005/0157797 | A1 | 7/2005 | Gaedke |
| 2007/0133891 | A1 | 6/2007 | Jeong |
| 2008/0137732 | A1* | 6/2008 | Sekiguchi .............. H04N 19/00 375/240.01 |
| 2008/0310504 | A1 | 12/2008 | Ye et al. |
| 2010/0086035 | A1 | 4/2010 | Park et al. |
| 2010/0309977 | A1 | 12/2010 | Andersson et al. |
| 2011/0038414 | A1 | 2/2011 | Song et al. |
| 2011/0038415 | A1 | 2/2011 | Min et al. |
| 2011/0243230 | A1 | 10/2011 | Liu |
| 2011/0292994 | A1 | 12/2011 | Lim et al. |
| 2012/0014444 | A1 | 1/2012 | Min et al. |
| 2012/0082223 | A1 | 4/2012 | Karczewicz et al. |
| 2012/0195380 | A1 | 8/2012 | Wang et al. |
| 2012/0224777 | A1 | 9/2012 | Kim et al. |
| 2012/0314766 | A1 | 12/2012 | Chien et al. |
| 2012/0328009 | A1 | 12/2012 | Sasai et al. |
| 2013/0028331 | A1 | 1/2013 | Min et al. |
| 2013/0089144 | A1 | 4/2013 | Lee et al. |
| 2013/0136178 | A1 | 5/2013 | Sasai et al. |
| 2013/0259128 | A1 | 10/2013 | Song et al. |
| 2013/0266064 | A1 | 10/2013 | Zhang et al. |
| 2013/0343454 | A1 | 12/2013 | Yeo et al. |
| 2014/0086323 | A1 | 3/2014 | Chuang et al. |
| 2014/0112388 | A1 | 4/2014 | Lai et al. |
| 2014/0133558 | A1 | 5/2014 | Seregin et al. |
| 2014/0140404 | A1 | 5/2014 | Liu et al. |
| 2014/0192861 | A1 | 7/2014 | Chuang et al. |
| 2014/0233644 | A1 | 8/2014 | Lee |
| 2015/0010054 | A1 | 1/2015 | Francois et al. |
| 2015/0208065 | A1 | 7/2015 | Seregin et al. |
| 2015/0215641 | A1 | 7/2015 | Park et al. |

FOREIGN PATENT DOCUMENTS

| | | |
|---|---|---|
| CN | 101971631 A | 2/2011 |
| JP | 5386657 B2 | 1/2014 |
| JP | 2014517630 A | 7/2014 |
| JP | 2014-523697 A | 9/2014 |
| JP | 2014-528670 A | 10/2014 |
| JP | 2014-529250 A | 10/2014 |
| JP | 5969608 B2 | 8/2016 |
| RU | 2010101116 A | 7/2011 |
| WO | 2008/157431 A2 | 12/2008 |
| WO | 2009/049250 A2 | 4/2009 |
| WO | 2011/021838 A2 | 2/2011 |
| WO | 2011/152635 A2 | 12/2011 |
| WO | 2012/170812 A1 | 12/2012 |
| WO | 2012/172791 A1 | 12/2012 |
| WO | 2013/002556 A2 | 1/2013 |
| WO | 2013/037489 A1 | 3/2013 |
| WO | 2013/051903 A1 | 4/2013 |

OTHER PUBLICATIONS

Wei-Jung Chien et al., "Parsing friendly intra mode coding", Joint Collaborative Team on Video Coding (JCT-VC) of ITU-T SG16 WP3 and ISO/IEC JTC1/SC29/WG11, 6th Meeting, Torino, IT, Jul. 14-22, 2011, Document JCTVC-F459r2, 5 pages.

Edouard Francois et al., "CE6b: Mode ranking for remaining mode coding with 2 or 3 MPMs," Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document JCTVC-G242, 5 pages.

Benjamin Bross et al., "WD5: Working Draft 5 of High-Efficiency Video Coding," Joint Collaborative Team on Viceo Coding (JCT-VC) of ITU-T SG16 WP3 and ISO/IEC JTC1/SC29/WG11, Nov. 21-30, 2011, Geneva, CH, Document JCTVC-G1103_d3 (version 4), 14 pages.

Frank Bossen, "On software complexity," Joint Collaborative Team on Video Coding (JCT-VC) of ITU-T SG16 WP3 and ISO/IEC JTC1/SC29/WG11, 7th Meeting, Geneva, CH, Nov. 21-30, 2011, Document JCTVC-G757r1, 7 pages.

Hui Li Tan et al., "Non CE6: Unification of the number of intra prediction modes," Joint Collaborative Team on Video Coding (JCT-VC) of ITU-T SG16 WP3 and ISO/IEC JTC1/SC29/WG11, 8th Meeting: San José, CA, Feb. 1-10, 2012, Document JCTVC-H0166r2, 4 pages.

Gary J. Sullivan et al., "Overview of the High Efficiency Video Coding (HEVC) Standard", IEEE Transactions on Circuits and Systems for Video Technology 22(12):1649-68, Dec. 2012, 20 pages.

Intl. Telecomm. Union, ITU-T H.265, Series H: Audiovisual and Multimedia Systems, Infrastructure of audiovisual services—Coding of moving video, "High efficiency video coding," Apr. 2015, 634 pages.

Guo, M. et al., "Improved intra mode coding", Joint Collaborative Team on Video Coding (JCT-VC) of ITU-T SG16 WP3 and ISO/IEC JTC1/SC29/WG11, 4th Meeting, Daegu, KR, Jan. 20-28, 2011, Document JCTVC-D166, XP030008206, 7 pages.

Wiegand, T. et al., "WD1: Working Draft 1 of High efficiency video coding", Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, Document JCTVC-C403, XP030008032, 137 pages.

Qualcomm, Inc., "Improved Intra Coding", COM 16—C 257 E, Telecommunication Standardization Sector, Intl. Telecomm. Union, Jun. 20, 2007, XP030003827, 4 pages.

Guo, M. et al., "CE14 Subtest 1: The most probable mode coding for Luma", Joint Collaborative Team on Video Coding (JCT-VC) of ITU-T SG16 WP3 and ISO/IEC JTC1/SC29/WG11, 5th Meeting, Geneva, CH, Mar. 16-23, 2011, JCTVC-E088, XP030008594, 3 pages.

Lai, C. et al., "Non CE6: Unify the intra mode number for all PU size", Joint Collaborative Team on Video Coding (JCT-VC) of ITU-T SG16 WP3 and ISO/IEC JTC1/SC29/WG11, 8th Meeting: San José, CA, USA, Feb. 1-10, 2012, Document: JCTVC-H0342_r1, 3 pages.

Ehsan Maani et al., "Intra mode coding using logical mode numbering", Joint Collaborative Team on Video Coding (JCT-VC) of ITU-T SG16 WP3 and ISO/IEC JTC1/SC29/WG11, 8th Meeting: San Jose, CA, Feb. 1-10, 2012, Document JCTVC-H0407, 4 pages.

Tzu-Der Chuang et al., "Luma Intra Prediction Mode Coding", Joint Collaborative Team on Video Coding (JCT-VC) of ITU-T SG16 WP3 and ISO/IEC JTC1/SC29/WG11, 6th Meeting, Torino, IT, Jul. 14-22, 2011, Document JCTVC-F062_r2, 5 pages.

Edouard Francois et al., "Modified Intra Mode Coding," Joint Collaborative Team on Video Coding (JCT-VC) of ITU-T SG16

(56) References Cited

OTHER PUBLICATIONS

WP3 and ISO/IEC JTC1/SC29/WG11, 6th Meeting, Torino, IT, Jul. 14-22, 2011, Document JCTVC-F269, 8 pages.

* cited by examiner

| Left upper block | Upper block | Right upper block |
|---|---|---|
| Left block | Current intra-frame encoding block/ Current intra-frame decoding block | Right block |
| | Lower block | |

FIG. 2

ENCODING AND DECODING METHODS AND APPARATUSES

CROSS-REFERENCE TO RELATED APPLICATIONS

This application is a continuation of U.S. patent application Ser. No. 14/142,437, filed on Dec. 27, 2013, which is a continuation of International Patent Application No. PCT/CN2013/070778, filed on Jan. 21, 2013, which claims priority to Chinese Patent Application No. 201210018036.3, filed on Jan. 19, 2012, All of the afore-mentioned patent applications are hereby incorporated by reference in their entireties.

TECHNICAL FIELD

Embodiments of the present disclosure relate to methods and apparatuses for encoding and decoding a video image.

BACKGROUND

During both video image encoding and video image decoding, prediction units obtained by dividing an image block need to be predicted. During a prediction, available prediction modes are usually preset for prediction blocks according to sizes of the prediction blocks, which results in different numbers of available prediction modes for prediction blocks of different sizes during video encoding. As shown in Table 1, when the size of a prediction block is 4×4, an intra-frame prediction mode (CurrMode) is selected from prediction modes 0-17; when the size of the prediction block is 8×8, 16×16 or 32×32, a current intra-frame prediction mode is selected from prediction modes 0-35; and for a 64×64 prediction block, an intra-frame prediction mode can only be selected from prediction modes 0-3.

TABLE 1

Numbers of prediction modes for prediction blocks of different sizes

| (Block size) | Number of prediction modes |
|---|---|
| 2 (4 × 4) | 18 |
| 3 (8 × 8) | 35 |
| 4 (16 × 16) | 35 |
| 5 (32 × 32) | 35 |
| 6 (64 × 64) | 4 |

In an encoding process, after a current intra-frame prediction mode of a prediction block is determined, an encoding scheme (for example, using 5-bit or 4-bit for encoding) for the current intra-frame prediction mode number needs to be further determined according to the size of the prediction block. In a decoding process, specific logic is also defined to determine the number of bits occupied by information of the current intra-frame prediction mode number in a code stream. This affects the encoding and decoding efficiency.

SUMMARY

The present disclosure provides an encoding method, including: obtaining an intra-frame prediction mode of a current intra-frame encoding block from a preset prediction mode set, where the intra-frame prediction mode is a prediction mode adopted when the current intra-frame encoding block is pixel-encoded; obtaining reference prediction modes of the current intra-frame encoding block, where the reference prediction modes are intra-frame prediction modes of available adjacent blocks of the current intra-frame encoding block or prediction modes in a preset backup reference mode set, where all prediction modes in the preset backup reference mode set belong to the prediction mode set; writing a first flag bit into a code stream according to the reference prediction modes and the intra-frame prediction mode, where the first flag bit is used to indicate whether the intra-frame prediction mode is the same as one of the reference prediction modes; and, when the intra-frame prediction mode of the encoding block is different from all the reference prediction modes, obtaining a prediction mode encoding value according to a size relationship between the value of the intra-frame prediction mode and values of the reference prediction modes, and encoding the prediction mode encoding value.

The present disclosure also provides a decoding method, including: obtaining a first flag bit from a code stream, where the first flag bit is used to indicate whether an intra-frame prediction mode of a current intra-frame decoding block is the same as one of reference prediction modes, and when the first flag bit indicates that the intra-frame prediction mode of the current intra-frame decoding block is different from all the reference prediction modes, obtaining mode encoded bits from the code stream according to a fixed number of bits, where the intra-frame prediction mode is a prediction mode adopted when the intra-frame decoding block is pixel-decoded; obtaining a prediction mode encoding value according to the mode encoded bits; obtaining reference prediction modes of the intra-frame decoding block, where the reference prediction modes are intra-frame prediction modes of available adjacent blocks of the current intra-frame decoding block or prediction modes in a preset backup reference mode set; and obtaining the intra-frame prediction mode of the current intra-frame decoding block according to a size relationship between the prediction mode encoding value and values of the reference prediction modes.

The present disclosure further provides an encoding apparatus using the encoding method provided in the present disclosure, where the encoding apparatus includes: a prediction module, configured to obtain an intra-frame prediction mode of a current intra-frame encoding block from a preset prediction mode set, and obtain reference prediction modes of the current intra-frame encoding block, where the reference prediction modes are intra-frame prediction modes of available adjacent blocks of the current intra-frame encoding block or prediction modes in a preset backup reference mode set, where all prediction modes in the preset backup reference mode set belong to the prediction mode set; a flag module, configured to write a first flag bit into a code stream according to the reference prediction modes and the intra-frame prediction mode, where the first flag bit is used to indicate whether the intra-frame prediction mode is the same as one of the reference prediction modes; and a prediction mode encoding module, configured to: when the intra-frame prediction mode of the encoding block is different from all the reference prediction modes, obtain a prediction mode encoding value according to a size relationship between the value of the intra-frame prediction mode and values of the reference prediction modes, and encode the prediction mode encoding value.

The present disclosure further provides a decoding apparatus using the decoding method of the present disclosure, where the decoding apparatus includes: a code stream reading module, configured to obtain a first flag bit from a code stream, where the first flag bit is used to indicate whether an intra-frame prediction mode of a current intra-frame decoding block is the same as a reference prediction mode, and when the first flag bit indicates that the intra-frame prediction mode of the current intra-frame decoding block is different from reference prediction modes, obtain mode encoded bits from the code stream according to a fixed number of bits, where the intra-frame prediction mode is a prediction mode adopted when the intra-frame decoding block is pixel-decoded; a reference prediction mode obtaining module, configured to obtain reference prediction modes of the intra-frame prediction block, where the reference prediction modes are intra-frame prediction modes of available adjacent blocks of the current intra-frame decoding block or prediction modes in a preset backup reference mode set; and a decoding module, configured to obtain a prediction mode encoding value according to the mode encoded bits, obtain the intra-frame prediction mode of the current intra-frame decoding block according to a size relationship between the prediction mode encoding value and values of the reference prediction modes, and decode the current intra-frame decoding block according to the intra-frame prediction mode.

Using the encoding method provided by the present disclosure, judgment logic of an encoding and decoding system can be saved, and thereby the encoding and decoding efficiency is improved.

BRIEF DESCRIPTION OF DRAWINGS

To illustrate the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 2 is a schematic diagram of a position relationship between an image block and adjacent blocks thereof;

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
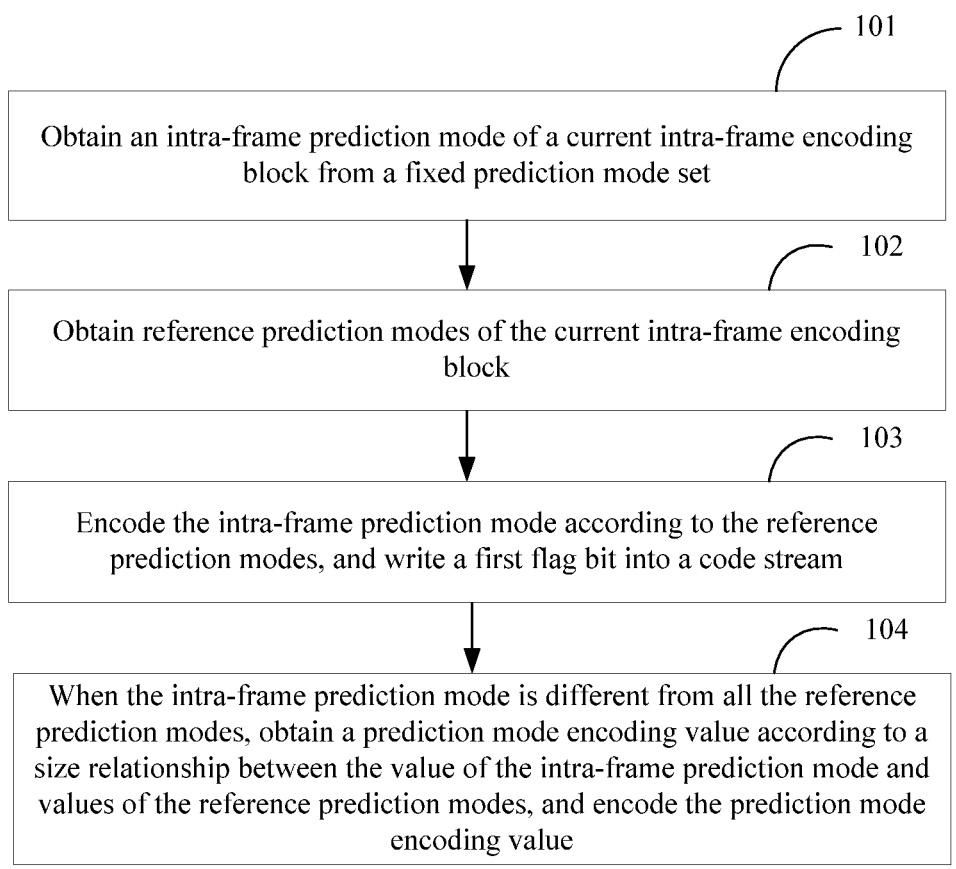
FIG. 1 is a schematic diagram of an encoding method according to an embodiment of the present disclosure.

Referring to FIG. 1, an embodiment of the present disclosure provides a method for encoding any current intra-frame encoding block. The method includes the following steps:

Step 101: Obtain an intra-frame prediction mode of a current intra-frame encoding block from a preset prediction mode set.

In the embodiment of the present disclosure, intra-frame prediction modes of current intra-frame encoding blocks of different sizes come from the same prediction mode set.

At the encoding end, the intra-frame prediction mode is a prediction mode adopted when an image block is pixel-encoded, and therefore may also be called an encoding prediction mode. If at the decoding end, the intra-frame prediction mode is a prediction mode adopted when the image block is pixel-decoded, and may also be called a decoding prediction mode.

Step 102: Obtain reference prediction modes of the current intra-frame encoding block.

The reference prediction modes are intra-frame prediction modes of available adjacent blocks of the current intra-frame encoding block or prediction modes in a preset backup reference mode set, where all prediction modes in the preset backup reference mode set belong to the prediction mode set.

Step 103: Encode the intra-frame prediction mode according to the reference prediction mode, and write a first flag bit into a code stream, where the first flag bit is used to indicate whether the intra-frame prediction mode is the same as one of the reference prediction modes.

Step 104: When the intra-frame prediction mode is different from all the reference prediction modes, obtain a prediction mode encoding value according to a size relationship between the value of the intra-frame prediction mode and values of the reference prediction modes, and encode the prediction mode encoding value.

In the embodiment of the present disclosure, if the current intra-frame encoding block obtains two reference prediction modes (a first reference prediction mode and a second reference prediction mode) according to intra-frame prediction modes of adjacent blocks, the obtaining a prediction mode encoding value according to a size relationship between the value of the intra-frame prediction mode and values of the reference prediction modes, and encoding the prediction mode encoding value includes the following steps:

Step 104a: If a value of the intra-frame prediction mode is greater than a value of only one reference prediction mode, the prediction mode encoding value equals the value of the intra-frame prediction mode minus 1, and if the value of the intra-frame prediction mode is greater than values of the two reference prediction modes, take a result of the value of the intra-frame prediction mode minus 2 as the prediction mode encoding value.

Step 104b: Encode the prediction mode encoding value using a fixed number of bits to obtain mode encoded bits, and write the mode encoded bits into the code stream, where, if a binary code length of the prediction mode encoding value is greater than the fixed number of bits, all bits of the mode encoded bits are 1, and a third flag bit is written into the code stream, where the third flag bit is used to indicate a value of the prediction mode encoding value in the preset set.

In the embodiment of the present disclosure, regardless of the size of the current intra-frame encoding block (that is, the intra-frame encoding prediction block), the intra-frame prediction mode is selected from uniform intra-frame prediction modes. Specifically, the HEVC standard gives 35 types of prediction modes for obtaining a predicted pixel value of the current intra-frame encoding block according to encoded pixel values of available adjacent blocks. During encoding, the 35 types of prediction modes are selected successively to perform prediction according to the available adjacent blocks of the intra-frame encoding block. Prediction results of the 35 types of prediction modes are compared, and a prediction mode in which a difference between the predicted pixel value and an actual image pixel value is the smallest is selected as the intra-frame prediction mode. A value range of the intra-frame prediction mode is 0-34, that is, greater than or equal to "0" and smaller than or equal to 34. Because the current intra-frame encoding block and the adjacent blocks thereof are predicted according to the same prediction mode set, a value range of the reference prediction modes is also 0-34. Of course, in another optional embodiment, the types and number of the prediction modes in the prediction mode set may be adjusted according to the development of technology, and the number of the prediction modes in the prediction mode set may be adjusted as required.

In the embodiment of the present disclosure, the reference prediction modes are intra-frame prediction modes of available adjacent blocks of the current intra-frame encoding block. Available adjacent blocks need to meet the following conditions: 1. being in the same stripe as the current intra-frame encoding block; and 2. having been encoded (in the case of a decoding process, available adjacent blocks need to have been decoded). For example, currently, encoding and decoding sequences generally adopted in the industry are from top to bottom and from left to right. Therefore, if being in the same stripe as the current intra-frame encoding block, a left block and an upper block of the current intra-frame encoding block may be selected as the available adjacent blocks of the current intra-frame encoding block. Adjacent blocks of the current intra-frame encoding block that do not meet the above conditions are unavailable adjacent blocks. For positions of the left block and the upper block relative to the current intra-frame encoding block, reference may be made to FIG. 2.

For the obtaining of reference prediction modes, intra-frame prediction modes of available adjacent blocks of the current intra-frame encoding block may be taken as reference prediction modes of the current intra-frame encoding block according to the encoding sequence. For example, currently, encoding and decoding sequences uniformly adopted in the industry are from left to right and from top to bottom. Therefore, if the upper block and the left block of the current intra-frame encoding block are available, the prediction modes of the left block and the right block are taken as reference prediction modes of the current intra-frame encoding block. If one of the two is unavailable, a prediction mode may be selected from the preset backup reference mode set as a reference prediction mode, for example, the DC prediction mode or the Planar prediction mode specified in the HEVC standard (both the two are prediction modes specified in the HEVC video encoding and decoding standard, and the specific predicting method is unrelated to the present disclosure, and will not be described herein). If both the upper block and the left block of the current intra-frame encoding block are unavailable, the reference prediction modes may also be selected from the preset backup reference mode set. If the two reference prediction modes are the same, one of the reference prediction modes may be replaced by a prediction mode in the backup reference mode set according to a preset rule. For example, it is assumed that values of the intra-frame prediction modes of the upper block and the left block of the current intra-frame encoding block are both 34, and then one of the reference prediction modes of the current intra-frame encoding block is 34, and a smaller value from the backup reference mode set, such as 0 or 3, is selected as the other reference prediction mode. Herein, because the prediction modes in the backup reference mode set need to cope with situations of "adjacent blocks being unavailable" and "intra-frame prediction modes of adjacent blocks being the same", the prediction modes in the backup reference mode set may be further divided. For example, the backup reference mode set is divided into a first reference set and a second reference set. When a specified number of reference prediction modes cannot be provided because the adjacent blocks of the current block are unavailable, a prediction mode (such as the DC prediction mode or Planar prediction mode) may be selected from the first reference set. When a specified number of reference prediction modes cannot be provided because the intra-frame prediction modes of adjacent blocks of the current block are the same, a prediction mode (for example a prediction mode with a value "0" or "3") is selected from the second reference set. Of course, if necessary, the reference mode set may be divided into more sets to cope with more situations, and the prediction modes in the reference mode set may belong to the first reference set and the second reference set at the same time, and may also belong to other types of reference sets at the same time.

In step 104a, let the value of the intra-frame prediction mode be CurrMode, and values of the two reference prediction modes are respectively first reference prediction mode Mode A and second reference prediction mode Mode B. The values of Mode A and Mode B may be set in a default sequence. For example, Mode A may be set to a reference prediction mode of the left block, and Mode B may be a reference prediction mode of the upper block.

If CurrMode=Mode A or CurrMode=Mode B, which means that the intra-frame prediction mode equals one of the reference prediction modes, the first flag bit (the length may be 1 bit) and a second flag bit are written into the code stream. The first flag bit is used to indicate whether the intra-frame prediction mode of the current prediction unit is the same as one of the reference prediction modes. For example, 0 indicates that the intra-frame prediction mode is the same as one of the reference prediction modes, and 1 indicates that the intra-frame prediction mode is different from all the reference prediction modes. The second flag bit is used to indicate the reference prediction mode equal to the intra-frame prediction mode. For example, 0 indicates that CurrMode equals Mode A, and 1 indicates that CurrMode equals Mode B.

If the intra-frame prediction mode is not equal to either of the two reference prediction modes, the prediction mode encoding value of the intra-frame prediction mode is obtained according to the size relationship between the value of the intra-frame prediction mode and values of the reference prediction modes, where, if the value of the intra-frame prediction mode is greater than a value of only one reference prediction mode, the prediction mode encoding value equals the value of the intra-frame prediction mode minus 1, and if values of the first reference prediction mode and the second reference prediction mode are both smaller than the value of the intra-frame prediction mode, the prediction mode encoding value equals the value of the intra-frame prediction mode minus 2. Since the values of both the intra-frame prediction mode and the reference prediction modes are 34, the value range of the prediction mode encoding value is 0-32. Obviously, when the value range of the prediction mode encoding value is 0-31, the prediction mode encoding value can be directly indicated by a 5-bit binary code, while the binary code of 32 needs six bits. Therefore, when the prediction mode encoding value is 31 and 32, the corresponding mode encoded bits are both 11111, and then the corresponding value of the third flag bit is written into the code stream to make a distinction. For example, when the prediction mode encoding value is 31, the corresponding mode encoded bits are 11111, and the third flag bit is 0; and when the prediction mode encoding value is 32, the corresponding mode encoded bits are 11111, and the third flag bit is 1. Of course, the setting may also be: when the prediction mode encoding value is 31, the corresponding mode encoded bits are 11111, and the third flag bit is 1; and when the prediction mode encoding value is 32, the corresponding mode encoded bits are 11111, and the third flag bit is 0.

For example, it is assumed that, when the value of the current intra-frame prediction mode is 12, and the most likely values of the intra-frame prediction modes are respectively 10 and 20. 12−1=11. Let the fixed number of bits be 5, and the result of encoding the intra-frame prediction mode is a 5-bit binary code of 11, 01011. If the most likely modes are respectively 13 and 20, the result of encoding the intra-frame prediction mode is a 5-bit binary code of 12, 01100. If the most likely modes are respectively 8 and 10, the result of encoding the intra-frame prediction mode is a 5-bit binary code of 10 (12−2), 01010.

In the embodiment of the present disclosure, because the same prediction mode set is set for prediction blocks of different sizes, during the encoding of the value of the intra-frame prediction mode, the prediction mode encoding value may be encoded using the fixed number of bits of only five bits in most cases. In addition, it is unnecessary to set additional judgment logic to determine the fixed number of bits for encoding the intra-frame prediction mode. Thereby, system resources are saved.

In another optional embodiment, similarly, it is assumed that the number of the prediction modes in the prediction mode set is 35. In order to solve the problem that the value range of the mode encoded bits can only be 0-31, three reference prediction modes may be set for the current intra-frame encoding block. For example, the prediction modes of the upper block, left block, and left upper block of the available adjacent blocks are taken as the reference prediction modes, or, a predefined prediction mode is further set as a third reference prediction mode on the basis that the intra-frame prediction modes of the available left block and upper block are used. Similarly, when the intra-frame prediction modes of the available adjacent blocks are the same, the reference prediction modes are supplemented from the reference mode set. In the process of obtaining the prediction mode encoding value, the operation of subtracting 1 from the value of the intra-frame prediction mode is performed according to the number of reference prediction modes that are smaller than the intra-frame prediction mode, so as to obtain the prediction mode encoding value. Because there are three reference prediction modes, and both the value range of the intra-frame prediction mode and the value range of the three reference prediction modes are 0-34, the value range of the prediction mode encoding value is 0-31. That is to say, the fixed number of bits of five bits can always be used to perform encoding. That is to say, in the embodiment of the present disclosure, the obtaining reference prediction modes of the current intra-frame encoding block in step 102 includes: obtaining three reference prediction modes of the current intra-frame encoding block; and in step 104, when the intra-frame prediction mode is different from all the reference prediction modes, the obtaining a prediction mode encoding value according to a size relationship between the value of the intra-frame prediction mode and values of the reference prediction modes and encoding the prediction mode encoding value includes the following steps:

Step 104a': If a value of the intra-frame prediction mode is greater than a value of only one reference prediction mode, take a result of the value of the intra-frame prediction mode minus 1 as the prediction mode encoding value; if the value of the intra-frame prediction mode is greater than values of two reference prediction modes, take a result of the value of the intra-frame prediction mode minus 2 as the prediction mode encoding value; and if the intra-frame prediction mode is greater than values of the three reference prediction modes, take a result of the value of the intra-frame prediction mode minus 3 as the prediction mode encoding value.

Step 104b': Encode the prediction mode encoding value using the fixed number of bits to obtain mode encoded bits, and write the mode encoded bits into the code stream.

Figure 3:
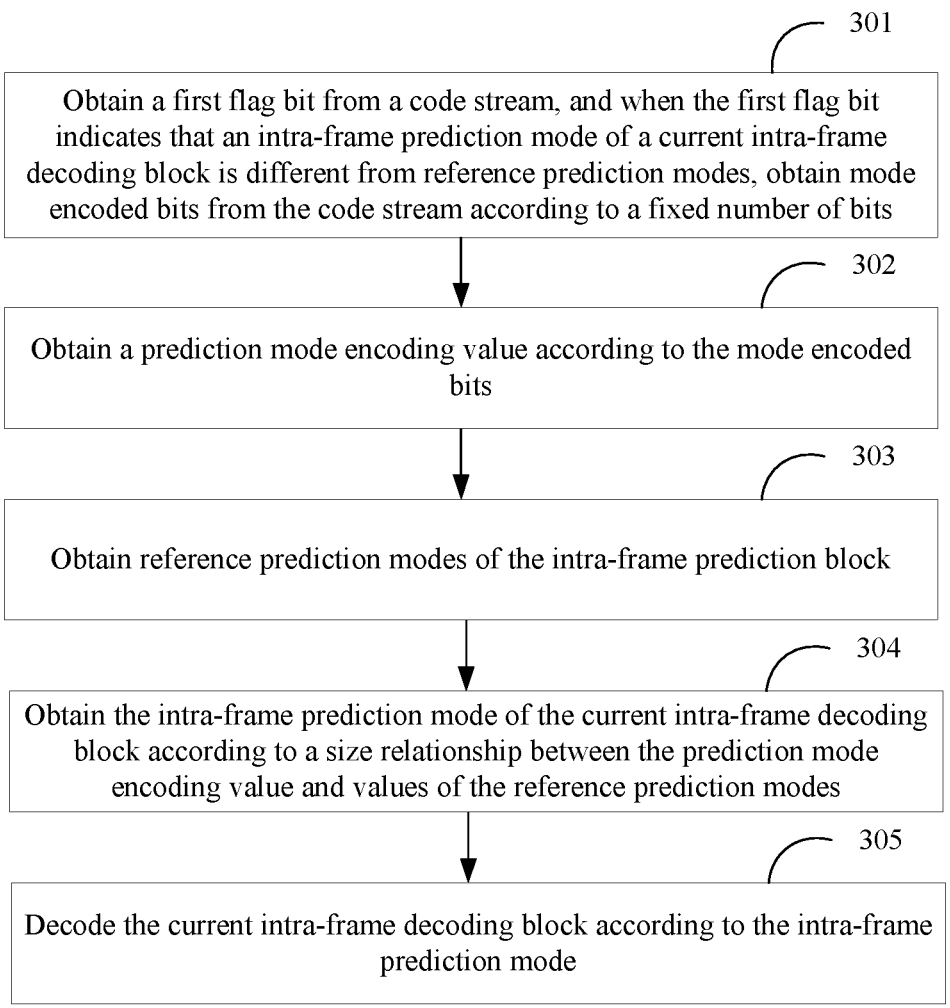
FIG. 3 is a schematic diagram of a decoding method according to an embodiment of the present disclosure.

Referring to FIG. 3, an embodiment of the present disclosure further provides a decoding method. The method includes the following steps:

Step 301: Obtain a first flag bit from a code stream, where the first flag bit is used to indicate whether an intra-frame prediction mode of a current intra-frame decoding block is the same as a reference prediction mode, and when the first flag bit indicates that the intra-frame prediction mode of the current intra-frame decoding block is different from reference prediction modes, obtain mode encoded bits from the code stream according to the fixed number of bits.

Step 302: Obtain a prediction mode encoding value according to the mode encoded bits.

Step 303: Obtain reference prediction modes of the intra-frame prediction block.

Step 304: Obtain the intra-frame prediction mode of the current intra-frame decoding block according to a size relationship between the prediction mode encoding value and values of the reference prediction modes.

Step 305: Decode the current intra-frame decoding block according to the intra-frame prediction mode.

In the embodiment of the present disclosure, corresponding to the encoding end, intra-frame prediction modes of current intra-frame decoding blocks of different sizes come from the same prediction mode set. Of course, the prediction mode set of the encoding end is the same as or corresponds to the prediction mode set of the decoding end.

At the decoding end, the obtaining of reference prediction modes is corresponding to the encoding end, and it is only necessary to take decoding prediction modes of available adjacent blocks of the current intra-frame decoding block as the reference prediction modes of the current intra-frame encoding block. For example, intra-frame prediction modes of an upper block and a left block of the current intra-frame decoding block are taken as the reference prediction modes of the current intra-frame decoding block.

Similar to the encoding end, in the embodiment of the present disclosure, available adjacent blocks of the current intra-frame decoding block need to meet the following conditions: 1. being in the same stripe as the current intra-frame decoding block; and 2. having been decoded.

If the prediction mode encoding value is greater than or equal to values of all the reference prediction modes, it is determined that a result of the prediction mode encoding value plus 2 is the value of the intra-frame prediction mode of the current intra-frame decoding block; if the prediction mode encoding value is greater than or equal to values of only one of two reference prediction modes, it is determined that a result of the prediction mode encoding value plus 1 is the value of the intra-frame prediction mode of the current intra-frame decoding block; and if the prediction mode encoding value is smaller than values of all the reference prediction modes, the prediction mode encoding value is taken as the value of the intra-frame prediction mode.

In the embodiment of the present disclosure, when the first flag bit indicates that the intra-frame prediction mode of the current intra-frame decoding block is the same as one of the reference prediction modes, a second flag bit is further obtained from the code stream. The second flag bit is used to indicate the reference prediction mode equal to the intra-frame prediction mode of the current intra-frame decoding block.

Similarly, when the encoded bits are not "11111", the prediction mode encoding value equals the encoded bits; and when the encoded bits are "11111", a third flag bit is obtained from the code stream, and the prediction mode encoding value is obtained from the preset set according to the third flag bit.

When the encoded bits are obtained, in an embodiment of the present disclosure, when the encoded bits are not "11111", the prediction mode encoding value equals the encoded bits; and when the encoded bits are "11111", the third flag bit is obtained from the code stream, and the prediction mode encoding value is obtained from the preset set according to the third flag bit. Correspondingly, the obtaining reference prediction modes of the intra-frame prediction block includes: obtaining two reference prediction modes; and the obtaining the intra-frame prediction mode of the current intra-frame decoding block according to a size relationship between the prediction mode encoding value and values of the reference prediction modes includes: if the prediction mode encoding value is smaller than values of the two reference prediction modes, it is determined that the value of the intra-frame prediction mode equals the prediction mode encoding value; if the prediction mode encoding value is greater than or equal to one of the values of the two reference prediction modes, it is determined that a result of the prediction mode encoding value plus 1 is the value of the intra-frame prediction mode; and if the prediction mode encoding value is greater than or equal to the values of the two reference prediction modes, it is determined that a result of the prediction mode encoding value plus 2 is the value of the intra-frame prediction mode.

In another embodiment of the present disclosure, three reference prediction modes are obtained directly. Then, if the prediction mode encoding value is smaller than values of the three reference prediction modes, the value of the intra-frame prediction mode equals the prediction mode encoding value; if the prediction mode encoding value is greater than or equal to a value of only one of the three reference prediction modes, a result of the prediction mode encoding value plus 1 is the value of the intra-frame prediction mode; if the prediction mode encoding value is greater than or equal to values of only two of the three reference prediction modes, a result of the prediction mode encoding value plus 2 is the value of the intra-frame prediction mode; and if the prediction mode encoding value is greater than or equal to values of the three reference prediction modes, a result of the prediction mode encoding value plus 3 is the value of the intra-frame prediction mode.

After the intra-frame prediction mode is obtained, the current intra-frame decoding block may be decoded according to the intra-frame prediction mode.

Corresponding to the encoding method and the decoding method provided in the embodiments of the present disclosure, the embodiments of the present disclosure further provide a corresponding encoding apparatus and decoding apparatus.

Figure 4:
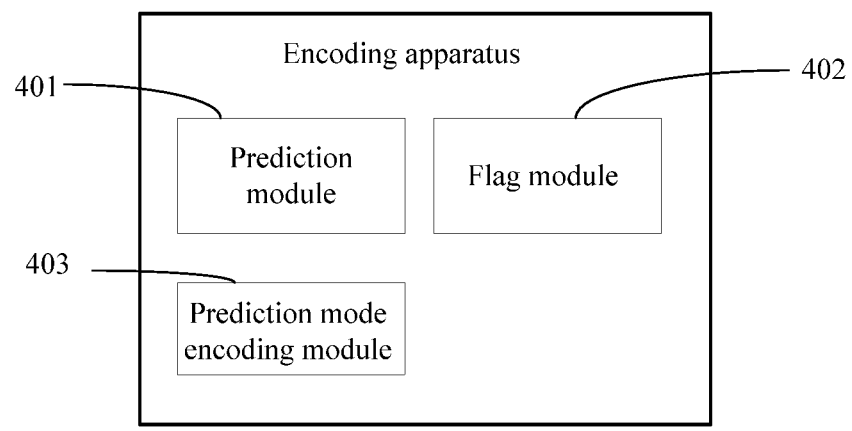
FIG. 4 is a schematic diagram of an encoding apparatus according to an embodiment of the present disclosure.

Referring to FIG. 4, an encoding apparatus provided in an embodiment of the present disclosure includes:

a prediction module 401, configured to obtain an intra-frame prediction mode of a current intra-frame encoding block from a preset prediction mode set, and obtain reference prediction modes of the current intra-frame encoding block according to intra-frame prediction modes of available adjacent blocks of the current intra-frame encoding block;

a flag module 402, configured to write a first flag bit into a code stream according to the reference prediction modes and the intra-frame prediction mode, where the first flag bit is used to indicate whether the intra-frame prediction mode is the same as one of the reference prediction modes; and a prediction mode encoding module 403, configured to: when the intra-frame prediction mode of the encoding block is different from all the reference prediction modes, obtain a prediction mode encoding value according to a size relationship between the value of the intra-frame prediction mode and values of the reference prediction modes, and encode the prediction mode encoding value.

The specific operating results of the prediction module 401, the flag module 402 and the prediction mode encoding module 403 are similar to those in the encoding method provided in the embodiment of the present disclosure.

For example, it is assumed that the number of prediction modes in the prediction mode set is still 35.

In an embodiment of the present disclosure, the prediction module 401 is specifically configured to obtain a first reference prediction mode and a second reference prediction mode according to the available adjacent blocks of the current intra-frame encoding block.

If both an upper block and a left block of the current intra-frame encoding block are available adjacent blocks, and intra-frame prediction modes of the upper block and the left block of the current intra-frame encoding block are different, the intra-frame prediction modes of the upper block and the left block are taken as the first reference prediction mode and the second reference prediction mode of the current intra-frame encoding block; and if enough reference prediction modes cannot be obtained for the current intra-frame encoding block according to the available adjacent blocks, a preset reference mode may be taken as a reference prediction mode to make up the number. Specifically, if both the upper block and the left block of the current intra-frame encoding block are available adjacent blocks, and the intra-frame prediction modes of the upper block and the left block of the current intra-frame encoding block are the same, the intra-frame prediction mode of the upper block or the left block of the current intra-frame encoding block is taken as a first reference prediction mode, and a preset prediction mode is selected from the prediction mode set as a second reference prediction mode; or if the upper block of the current intra-frame encoding block is an available adjacent block, while the left block is an unavailable adjacent block, the prediction mode of the upper block of the current intra-frame encoding block is taken as a first reference prediction mode, and a prediction mode is selected from the preset backup reference mode set as a second reference prediction mode; or if the upper block of the current intra-frame encoding block is an unavailable adjacent block, while the left block is an available adjacent block, the prediction mode of the left block of the current intra-frame encoding block is taken as a first reference prediction mode, and a prediction mode is selected from the preset backup reference mode set as a second reference prediction mode; or if both the upper block and the left block of the current intra-frame encoding block are unavailable adjacent blocks, two prediction modes are re-selected from the preset backup reference mode set as a first reference prediction mode and a second reference prediction mode.

The prediction mode encoding module 403 is specifically configured to:

if the value of the intra-frame prediction mode is greater than a value of only one reference prediction mode, take a result of the value of the intra-frame prediction mode minus 1 as the prediction mode encoding value; if the value of the intra-frame prediction mode is greater than values of the two reference prediction modes, take a result of the value of the intra-frame prediction mode minus 2 as the prediction mode encoding value; encode the prediction mode encoding value using a fixed number of bits to obtain mode encoded bits, and write the mode encoded bits into the code stream, where, if a binary code length of the prediction mode encoding value is greater than the fixed number of bits, the mode encoded bits are "11111" and a third flag bit is further written into the code stream, where the third flag bit is used to indicate a value of the prediction mode encoding value in the preset set.

In another embodiment of the present disclosure, the prediction module 401 is specifically configured to obtain three reference prediction modes according to the available adjacent blocks of the current intra-frame encoding block.

In another embodiment of the present disclosure, the prediction mode encoding module 403 is specifically configured to:

if the value of the intra-frame prediction mode is greater than a value of only one of the three reference prediction modes, take a result of the value of the intra-frame prediction mode minus 1 as the prediction mode encoding value; if the value of the intra-frame prediction mode is greater than values of two of the three reference prediction modes, take a result of the value of the intra-frame prediction mode minus 2 as the prediction mode encoding value; and if the intra-frame prediction mode is greater than values of the three reference prediction modes, determine that the prediction mode encoding value equals the value of the intra-frame prediction mode minus 3; and encode the prediction mode encoding value using the fixed number of bits to obtain mode encoded bits, and write the mode encoded bits into the code stream.

Figure 5:
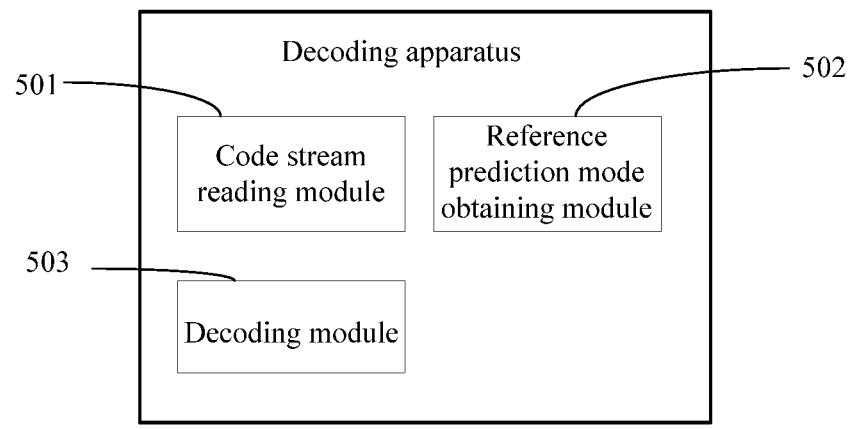
FIG. 5 is a schematic diagram of a decoding apparatus according to an embodiment of the present disclosure.

Referring to FIG. 5, FIG. 5 is a schematic diagram of a decoding apparatus according to an embodiment of the present disclosure. The decoding apparatus provided in the embodiment of the present disclosure includes:

a code stream reading module 501, configured to obtain a first flag bit from a code stream, where the first flag bit is used to indicate whether an intra-frame prediction mode of a current intra-frame decoding block is the same as a reference prediction mode, and when the first flag bit indicates that the intra-frame prediction mode of the current intra-frame decoding block is different from the reference prediction modes, obtain mode encoded bits from the code stream according to a fixed number of bits, where the intra-frame prediction mode is a prediction mode adopted when the intra-frame decoding block is pixel-decoded;

a reference prediction mode obtaining module 502, configured to obtain reference prediction modes of the intra-frame prediction block; and a decoding module 503, configured to obtain a prediction mode encoding value according to the mode encoded bits, obtain the intra-frame prediction mode of the current intra-frame decoding block according to a size relationship between the prediction mode encoding value and values of the reference prediction modes, and decode the current intra-frame decoding block according to the intra-frame prediction mode.

The specific working manners of the code stream reading module 501, the reference prediction mode obtaining module 502, and the decoding module 503 are the same as the decoding method provided in the embodiment of the present disclosure.

Specifically, the fixed number of bits is 5.

In an embodiment of the present disclosure, when the first flag bit indicates that the intra-frame prediction mode of the current intra-frame decoding block is different from the reference prediction modes, the code stream reading module 501 executes the following steps: if the encoded bits are not "11111", determine that the prediction mode encoding value equals the encoded bits; and if the encoded bits are "11111", obtain a bit from the code stream, and obtain the prediction mode encoding value from the preset set according to the bit. Correspondingly, the reference prediction mode obtaining module 502 obtains two reference prediction modes; and the decoding module 503 executes the following steps: if the prediction mode encoding value is smaller than values of the two reference prediction modes, determine that the value of the intra-frame prediction mode equals the prediction mode encoding value; if the prediction mode encoding value is greater than or equal to a value of only one of the two reference prediction modes, determine that a result of the prediction mode encoding value plus 1 is the value of the intra-frame prediction mode; and if the prediction mode encoding value is greater than or equal to values of the two reference prediction modes, determine that a result of the prediction mode encoding value plus 2 is the value of the intra-frame prediction mode.

In another embodiment of the present disclosure, the reference prediction mode obtaining module 502 obtains three reference prediction modes; and correspondingly, the decoding module 503 executes the following steps: if the prediction mode encoding value is smaller than values of the three reference prediction modes, determine that the value of the intra-frame prediction mode equals the prediction mode encoding value; if the prediction mode encoding value is greater than or equal to a value of only one of the three reference prediction modes, determine that a result of the prediction mode encoding value plus 1 is the value of the intra-frame prediction mode; if the prediction mode encoding value is greater than or equal to values of only two of the three reference prediction modes, determine that a result of the prediction mode encoding value plus 2 is the value of the intra-frame prediction mode; and if the prediction mode encoding value is greater than or equal to values of the three reference prediction modes, determine that a result of the prediction mode encoding value plus 3 is the value of the intra-frame prediction mode.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method by a video encoder for encoding an intra-frame prediction mode, comprising:

obtaining an intra-frame prediction mode of a current intra-frame encoding block from a preset prediction mode set;
obtaining reference prediction modes of the current intra-frame encoding block, wherein:
the reference prediction modes include an intra-frame prediction mode of an available adjacent block of the current intra-frame encoding block and a prediction mode in a preset backup reference mode set; and
all prediction modes in the preset backup reference mode set belong to the preset prediction mode set, and the reference prediction modes are a combination of three prediction modes that are independent to the sizes of the available adjacent block and the current intra-frame decoding block, and belong to the preset prediction mode set which has 35 prediction modes;
writing a first flag bit into a code stream according to the reference prediction modes and the intra-frame prediction mode, wherein the first flag bit indicates whether the intra-frame prediction mode is the same as one of the reference prediction modes; and
when the intra-frame prediction mode of the encoding block is different from all the reference prediction modes:
modifying a value of the intra-frame prediction mode of the encoding block according to a size relationship between the value of the intra-frame prediction mode and values of the reference prediction modes; and
encoding a prediction mode encoding value that is the modified value of intra-frame prediction mode of the encoding block.

2. The encoding method according to claim 1, wherein wherein a value range of the intra-frame prediction mode is 0-34, and wherein a value range of the reference prediction modes is 0-34.

3. The encoding method according to claim 2, wherein the obtaining reference prediction modes of the current intra-frame encoding block comprises: obtaining a first reference prediction mode and a second reference prediction mode according to intra-frame prediction modes of available adjacent blocks of the current intra-frame encoding block.

4. The encoding method according to claim 3, wherein the obtaining a first reference prediction mode and a second reference prediction mode according to intra-frame prediction modes of available adjacent blocks of the current intra-frame encoding block comprises:
if both an upper block and a left block of the current intra-frame encoding block are available adjacent blocks, and intra-frame prediction modes of the upper block and the left block of the current intra-frame encoding block are different, using the intra-frame prediction modes of the upper block and the left block as the first reference prediction mode and the second reference prediction mode of the current intra-frame encoding block; or
if both an upper block and a left block of the current intra-frame encoding block are available adjacent blocks, and intra-frame prediction modes of the upper block and the left block of the current intra-frame encoding block are the same, using an intra-frame prediction mode of the upper block or the left block of the current intra-frame encoding block as the first reference prediction mode, and selecting a prediction mode from prediction modes in the preset backup reference mode set as the second reference prediction mode; or if an upper block of the current intra-frame encoding block is an available adjacent block, while a left block is an unavailable adjacent block, using a prediction mode of the upper block of the current intra-frame encoding block as the first reference prediction mode, and selecting a prediction mode from the preset backup reference mode set as the second reference prediction mode; or
if an upper block of the current intra-frame encoding block is an unavailable adjacent block, while a left block is an available adjacent block, using a prediction mode of the left block of the current intra-frame encoding block as the first reference prediction mode, and selecting a prediction mode from the preset backup reference mode set as the second reference prediction mode; or
if both an upper block and a left block of the current intra-frame encoding block are unavailable adjacent blocks, selecting two prediction modes from the preset backup reference mode set as the first reference prediction mode and the second reference prediction mode.

5. The encoding method according to claim 4, wherein the method further comprises:
if a value of the intra-frame prediction mode is greater than a value of only one reference prediction mode, using a result of the value of the intra-frame prediction mode minus 1 as the prediction mode encoding value, and if the value of the intra-frame prediction mode is greater than values of two reference prediction modes, using a result of the value of the intra-frame prediction mode minus 2 as the prediction mode encoding value; and
encoding the prediction mode encoding value using a fixed number of bits to obtain mode encoded bits, and writing the mode encoded bits into the code stream, wherein, if a binary code length of the prediction mode encoding value is greater than the fixed number of bits, the mode encoded bits are "11111" and a third flag bit is further written into the code stream, wherein the third flag bit indicates a value of the prediction mode encoding value in the preset set.

6. The encoding method according to claim 2, wherein the obtaining reference prediction modes of the current intra-frame encoding block comprises: obtaining three reference prediction modes according to intra-frame prediction modes of available adjacent blocks of the current intra-frame encoding block, or according to intra-frame prediction modes of available adjacent blocks of the current intra-frame encoding block and a preset third reference prediction mode.

7. The encoding method according to claim 6, wherein the modifying the value of intra-frame prediction mode of the encoding block according to a size relationship between the value of the intra-frame prediction mode and values of the reference prediction modes, using the modified intra-frame prediction mode of the encoding block as an prediction mode encoding value, and encoding the prediction mode encoding value comprises:
if a value of the intra-frame prediction mode is greater than a value of only one of the three reference prediction modes, using a result of the value of the intra-frame prediction mode minus 1 as the prediction mode encoding value, if the value of the intra-frame prediction mode is greater than values of two of the three reference prediction modes, using a result of the value of the intra-frame prediction mode minus 2 as the prediction mode encoding value, and if the intra-frame prediction mode is greater than values of the three reference prediction modes, using a result of the value of the intra-frame prediction mode minus 3 as the prediction mode encoding value; and encoding the prediction mode encoding value using a fixed number of bits to obtain mode encoded bits, and writing the mode encoded bits into the code stream.

8. The encoding method according to claim 1, wherein current intra-frame encoding blocks of different sizes all use the same prediction mode set.

9. A method by a video decoder for decoding an intra-frame prediction mode, comprising:

obtaining a first flag bit from a code stream, wherein the first flag bit indicates whether an intra-frame prediction mode of a current intra-frame decoding block is the same as a reference prediction mode, and when the first flag bit indicates that the intra-frame prediction mode of the current intra-frame decoding block is different from reference prediction modes, obtaining mode encoded bits from the code stream according to a fixed number of bits;

obtaining a prediction mode encoding value according to the mode encoded bits;

obtaining reference prediction modes of the intra-frame prediction block, wherein the reference prediction modes include an intra-frame prediction mode of an available adjacent block of the current intra-frame decoding block and a prediction mode in a preset backup reference mode set, wherein all prediction modes in the preset backup reference mode set belong to the preset prediction mode set, and the reference prediction modes are a combination of three prediction modes that are independent to the sizes of the available adjacent block and the current intra-frame decoding block and belong to the preset prediction mode set which has 35 prediction modes; and modifying the prediction mode encoding value of the current intra-frame decoding block according to a size relationship between the prediction mode encoding value and values of the reference prediction modes, and using the modified prediction mode encoding value of the current intra-frame decoding block as the value of the intra-frame prediction mode of the current intra-frame decoding block.

10. The decoding method according to claim 9, wherein the fixed number of bits is 5.

11. The decoding method according to claim 10, wherein the obtaining a prediction mode encoding value according to the mode encoded bits comprises:

when the encoded bits are not "11111", determining that the prediction mode encoding value equals the encoded bits; and when the encoded bits are "11111", obtaining a third flag bit from the code stream, and obtaining the prediction mode encoding value from a preset prediction mode set according to the third flag bit, wherein the third flag bit is configured to indicate, in a predefined group of values, a value corresponding to the prediction mode encoding value.

12. The decoding method according to claim 11, wherein the obtaining reference prediction modes of the intra-frame prediction block comprises: obtaining two reference prediction modes, and the modifying the prediction mode encoding value of the current intra-frame decoding block according to a size relationship between the prediction mode encoding value and values of the reference prediction modes, and using the modified prediction mode encoding value of the current intra-frame decoding block as the value of the intra-frame prediction mode of the current intra-frame decoding block comprises:

if the prediction mode encoding value is smaller than values of the two reference prediction modes, determining that a value of the intra-frame prediction mode equals the prediction mode encoding value;

if the prediction mode encoding value is greater than or equal to a value of only one of the two reference prediction modes, determining that a result of the prediction mode encoding value plus 1 is the value of the intra-frame prediction mode; and if the prediction mode encoding value is greater than or equal to values of the two reference prediction modes, determining that a result of the prediction mode encoding value plus 2 is the value of the intra-frame prediction mode.

13. The decoding method according to claim 10, wherein the obtaining reference prediction modes of the intra-frame prediction block comprises: obtaining three reference prediction modes, and the modifying the prediction mode encoding value of the current intra-frame decoding block according to a size relationship between the prediction mode encoding value and values of the reference prediction modes, and using the modified prediction mode encoding value of the current intra-frame decoding block as the value of the intra-frame prediction mode of the current intra-frame decoding block comprises:

if the prediction mode encoding value is smaller than values of the three reference prediction modes, determining that a value of the intra-frame prediction mode equals the prediction mode encoding value;

if the prediction mode encoding value is greater than or equal to a value of only one of the three reference prediction modes, determining that a result of the prediction mode encoding value plus 1 is the value of the intra-frame prediction mode;

if the prediction mode encoding value is greater than or equal to values of only two of the three reference prediction modes, determining that a result of the prediction mode encoding value plus 2 is the value of the intra-frame prediction mode; and if the prediction mode encoding value is greater than or equal to values of the three reference prediction modes, determining that a result of the prediction mode encoding value plus 3 is the value of the intra-frame prediction mode.

14. The decoding method according to claim 9, wherein intra-frame prediction modes of current intra-frame decoding blocks of different sizes come from the same prediction mode set, and all prediction modes in the backup reference mode set belong to the prediction mode set.

15. An encoding apparatus, comprising:

a prediction circuit, configured to obtain an intra-frame prediction mode of a current intra-frame encoding block from a preset prediction mode set, and obtain reference prediction modes of the current intra-frame encoding block, wherein the reference prediction modes include an intra-frame prediction mode of an available adjacent block of the current intra-frame encoding block and a prediction mode in a preset backup reference mode set, wherein all prediction modes in the preset backup reference mode set belong to the preset prediction mode set, and the reference prediction modes are a combination of three prediction modes that are independent to the size of the available adjacent block and the current intra-frame decoding block and belong to the preset prediction mode set which has 35 prediction modes;

a flag circuit, configured to write a first flag bit into a code stream according to the reference prediction modes and the intra-frame prediction mode, wherein the first flag bit indicates whether the intra-frame prediction mode is the same as one of the reference prediction modes; and a prediction mode encoding circuit, configured to: when the intra-frame prediction mode of the encoding block is different from all the reference prediction modes, modifying a value of the intra-frame prediction mode of the encoding block according to a size relationship between the value of the intra-frame prediction mode and values of the reference prediction modes, encode a prediction mode encoding value that is the modified value of the intra-frame prediction mode of the encoding block.

16. The encoding apparatus according to claim 15, wherein a value range of the intra-frame prediction mode is 0-34, and wherein a value range of the reference prediction modes is 0-34.

17. The encoding apparatus according to claim 16, wherein the prediction circuit is configured to obtain a first reference prediction mode and a second reference prediction mode according to intra-frame prediction modes of available adjacent blocks of the current intra-frame encoding block.

18. The encoding apparatus according to claim 17, wherein the prediction circuit is configured to:
if both an upper block and a left block of the current intra-frame encoding block are available adjacent blocks, and intra-frame prediction modes of the upper block and the left block of the current intra-frame encoding block are different, use intra-frame prediction modes of the upper block and the left block as the first reference prediction mode and the second reference prediction mode of the current intra-frame encoding block; or if both an upper block and a left block of the current intra-frame encoding block are available adjacent blocks, and intra-frame prediction modes of the upper block and the left block of the current intra-frame encoding block are the same, use an intra-frame prediction mode of the upper block or the left block of the current intra-frame encoding block as the first reference prediction mode, and obtain the second reference prediction mode from the preset backup reference mode set; or if an upper block of the current intra-frame encoding block is an available adjacent block, while a left block is an unavailable adjacent block, use a prediction mode of the upper block of the current intra-frame encoding block as the first reference prediction mode, and select a prediction mode from the preset backup reference mode set as the second reference prediction mode; or if an upper block of the current intra-frame encoding block is an unavailable adjacent block, while a left block is an available adjacent block, use a prediction mode of the left block of the current intra-frame encoding block as the first reference prediction mode, and select a prediction mode from the preset backup reference mode set as the second reference prediction mode; or if both an upper block and a left block of the current intra-frame encoding block are unavailable adjacent blocks, re-select two prediction modes from the preset backup reference mode set as the first reference prediction mode and the second reference prediction mode.

19. The encoding apparatus according to claim 18, wherein the prediction mode encoding circuit is configured to:
if a value of the intra-frame prediction mode is greater than a value of only one reference prediction mode, use a result of the value of the intra-frame prediction mode minus 1 as the prediction mode encoding value, and if the value of the intra-frame prediction mode is greater than values of two reference prediction modes, use a result of the value of the intra-frame prediction mode minus 2 as the prediction mode encoding value; and encode the prediction mode encoding value taking a fixed number of bits to obtain mode encoded bits, write the mode encoded bits into the code stream, wherein, if a binary code length of the prediction mode encoding value is greater than the fixed number of bits, the mode encoded bits are "11111" and a third flag bit is further written into the code stream, wherein the third flag bit indicates a value of the prediction mode encoding value in the preset prediction mode set.

20. The encoding apparatus according to claim 16, wherein the prediction circuit is configured to obtain three reference prediction modes according to intra-frame prediction modes of available adjacent blocks of the current intra-frame encoding block, or according to intra-frame prediction modes of available adjacent blocks of the current intra-frame encoding block and a preset third reference prediction mode.

21. The encoding apparatus according to claim 20, wherein the prediction mode encoding circuit is configured to:
if a value of the intra-frame prediction mode is greater than a value of only one of the three reference prediction modes, use a result of the value of the intra-frame prediction mode minus 1 as the prediction mode encoding value, if the value of the intra-frame prediction mode is greater than values of two of the three reference prediction modes, use a result of the value of the intra-frame prediction mode minus 2 as the prediction mode encoding value, and if the value of the intra-frame prediction mode is greater than values of the three reference prediction modes, use a result of the value of the intra-frame prediction mode minus 3 as the prediction mode encoding value; and encode the prediction mode encoding value using a fixed number of bits to obtain mode encoded bits, and write the mode encoded bits into the code stream.

22. The encoding apparatus according to claim 15, wherein current intra-frame encoding blocks of different sizes use the same prediction mode set.

23. A decoding apparatus, comprising:
a code stream reading circuit, configured to obtain a first flag bit from a code stream, wherein the first flag bit indicates whether an intra-frame prediction mode of a current intra-frame decoding block is the same as a reference prediction mode, and when the first flag bit indicates that the intra-frame prediction mode of the current intra-frame decoding block is different from reference prediction modes, obtain mode encoded bits from the code stream according to the fixed number of bits;

a reference prediction mode obtaining module circuit, configured to obtain reference prediction modes of the intra-frame prediction block, wherein the reference prediction modes include an intra-frame prediction modes of an available adjacent block of the current intra-frame decoding block and a prediction mode in a preset backup reference mode set, wherein all prediction modes in the preset backup reference mode set belong to the preset prediction mode set, and the reference prediction modes are a combination of three prediction modes that are independent to the sizes of the available adjacent block and the current intra-frame decoding block and belong to the preset prediction mode set which has 35 prediction modes; and a decoding circuit, configured to obtain a prediction mode encoding value according to the mode encoded bits, modify the prediction mode encoding value according to a size relationship between the prediction mode encoding value and values of the reference prediction modes, using the modified prediction mode encoding value as the value of intra-prediction mode of the current intra-frame, and decode the current intra-frame decoding block according to the intra-frame prediction mode that is corresponding to the value of intra-prediction mode of the current intra-frame.

24. The decoding apparatus according to claim 23, wherein the fixed number of bits is 5.

25. The decoding apparatus according to claim 24, wherein the decoding circuit is configured to:
when the encoded bits are not "11111", determine that the prediction mode encoding value equals the encoded bits; and
when the encoded bits are "11111", obtain a third flag bit from the code stream, and obtain the prediction mode encoding value from a preset prediction mode set according to the third flag bit, wherein the third flag bit is configured to indicate, in a predefined group of values, a value corresponding to the prediction mode encoding value.

26. The decoding apparatus according to claim 25, wherein the reference prediction mode obtaining circuit obtains two reference prediction modes, and
wherein the decoding circuit is configured to:
if the prediction mode encoding value is smaller than values of the two reference prediction modes, determine that a value of the intra-frame prediction mode equals the prediction mode encoding value;
if the prediction mode encoding value is greater than or equal to a value of only one of the two reference prediction modes, determine that a result of the prediction mode encoding value plus 1 is the value of the intra-frame prediction mode; and
if the prediction mode encoding value is greater than or equal to values of the two reference prediction modes, determine that a result of the prediction mode encoding value plus 2 is the value of the intra-frame prediction mode.

27. The decoding apparatus according to claim 25, wherein the reference prediction mode obtaining circuit obtains three reference prediction modes, and
wherein the decoding circuit is configured to:
if the prediction mode encoding value is smaller than values of the three reference prediction modes, determine that a value of the intra-frame prediction mode equals the prediction mode encoding value;
if the prediction mode encoding value is greater than or equal to a value of only one of the three reference prediction modes, determine that a result of the prediction mode encoding value plus 1 is the value of the intra-frame prediction mode;

if the prediction mode encoding value is greater than or equal to values of only two of the three reference prediction modes, determine that a result of the prediction mode encoding value plus 2 is the value of the intra-frame prediction mode; and
if the prediction mode encoding value is greater than or equal to values of the three reference prediction modes, determine that a result of the prediction mode encoding value plus 3 is the value of the intra-frame prediction mode.

28. The decoding apparatus according to claim 23, wherein intra-frame prediction modes of current intra-frame decoding blocks of different sizes come from the same prediction mode set, and all prediction modes in the backup reference mode set belong to the prediction mode set.

29. A video encoding device for encoding an intra-frame prediction mode, comprising: a non-transitory memory storage comprising instructions; and one or more processors in communication with the memory, wherein the one or more processors execute the instructions to:
obtain an intra-frame prediction mode of a current intra-frame encoding block from a preset prediction mode set;
obtain reference prediction modes of the current intra-frame encoding block, wherein the reference prediction modes include an intra-frame prediction mode of an available adjacent block of the current intra-frame encoding block and a prediction mode in a preset backup reference mode set, wherein all prediction modes in the preset backup reference mode set belong to the preset prediction mode set, and the reference prediction modes are a combination of three prediction modes that are independent to the size of the available adjacent block and the current intra-frame decoding block and belong to the preset prediction mode set which has 35 prediction modes;
write a first flag bit into a code stream according to the reference prediction modes and the intra-frame prediction mode, wherein the first flag bit indicates whether the intra-frame prediction mode is the same as one of the reference prediction modes; and
when the intra-frame prediction mode of the encoding block is different from all the reference prediction modes, modify a value of the intra-frame prediction mode of the encoding block according to a size relationship between the value of the intra-frame prediction mode and values of the reference prediction modes, and encode a prediction mode encoding value that is the modified value of the intra-frame prediction mode of the encoding block.

30. The video encoding device according to claim 29, wherein the preset prediction mode set comprises 35 types of prediction modes, wherein a value range of the intra-frame prediction mode is 0-34, and wherein a value range of the reference prediction modes is 0-34.

31. The video encoding device according to claim 30, wherein the one or more processors execute the instructions to obtain reference prediction modes of the current intra-frame encoding block comprises: to obtain a first reference prediction mode and a second reference prediction mode according to intra-frame prediction modes of available adjacent blocks of the current intra-frame encoding block.

32. The encoding method according to claim 30, wherein the one or more processors execute the instructions to obtain reference prediction modes of the current intra-frame encoding block comprises: obtain three reference prediction modes according to intra-frame prediction modes of available adjacent blocks of the current intra-frame encoding block, or according to intra-frame prediction modes of available adjacent blocks of the current intra-frame encoding block and a preset third reference prediction mode.

33. The encoding method according to claim 32, wherein the method further comprises:
   if a value of the intra-frame prediction mode is greater than a value of only one of the three reference prediction modes, to use a result of the value of the intra-frame prediction mode minus 1 as the prediction mode encoding value, if the value of the intra-frame prediction mode is greater than values of two of the three reference prediction modes, use a result of the value of the intra-frame prediction mode minus 2 as the prediction mode encoding value, and if the intra-frame prediction mode is greater than values of the three reference prediction modes, use a result of the value of the intra-frame prediction mode minus 3 as the prediction mode encoding value; and
   encode the prediction mode encoding value taking a fixed number of bits to obtain mode encoded bits, and write the mode encoded bits into the code stream.

34. The encoding method according to claim 29, wherein current intra-frame encoding blocks of different sizes all use the same prediction mode set.

35. A video decoding device for decoding an intra-frame prediction mode, comprising: a non-transitory memory storage comprising instructions; and one or more processors in communication with the memory, wherein the one or more processors execute the instructions to:
   obtain a first flag bit from a code stream, wherein the first flag bit indicates whether an intra-frame prediction mode of a current intra-frame decoding block is the same as a reference prediction mode, and when the first flag bit indicates that the intra-frame prediction mode of the current intra-frame decoding block is different from reference prediction modes, obtain mode encoded bits from the code stream according to a fixed number of bits;
   obtain a prediction mode encoding value according to the mode encoded bits;
   obtain reference prediction modes of the intra-frame prediction block, wherein the reference prediction modes include an intra-frame prediction mode of an available adjacent block of the current intra-frame decoding block and a prediction mode in a preset backup reference mode set, wherein all prediction modes in the preset backup reference mode set belong to the preset prediction mode set, and the reference prediction modes are a combination of three prediction modes that are independent to the size of the available adjacent blocks and the size of the current intra-frame decoding block and belong to the preset prediction mode set which has 35 prediction modes; and
   modify the prediction mode encoding value of the current intra-frame decoding block according to a size relationship between the prediction mode encoding value and values of the reference prediction modes, and use the modified prediction mode encoding value of the current intra-frame decoding block as the value of the intra-frame prediction mode of the current intra-frame decoding block.

36. The video decoding device according to claim 35, wherein the fixed number of bits is 5.

37. The video decoding device according to claim 35, wherein the one or more processors execute the instructions to obtain a prediction mode encoding value according to the mode encoded bits comprises:
   when the encoded bits are not "11111", determine that the prediction mode encoding value equals the encoded bits; and
   when the encoded bits are "11111", obtain a third flag bit from the code stream, and obtain the prediction mode encoding value from a preset prediction mode set according to the third flag bit, wherein the third flag bit is configured to indicate, in a predefined group of values, a value corresponding to the prediction mode encoding value.

38. The decoding method according to claim 36, wherein the one or more processors execute the instructions to obtain three reference prediction modes of the intra-frame prediction block comprises: obtaining three reference prediction modes, and
   the one or more processors execute the instructions to modify the prediction mode encoding value of the current intra-frame decoding block according to a size relationship between the prediction mode encoding value and values of the reference prediction modes, and use the modified prediction mode encoding value of the current intra-frame decoding block as the value of the intra-frame prediction mode of the current intra-frame decoding block comprises:
   if the prediction mode encoding value is smaller than values of the three reference prediction modes, determine that a value of the intra-frame prediction mode equals the prediction mode encoding value;
   if the prediction mode encoding value is greater than or equal to a value of only one of the three reference prediction modes, determine that a result of the prediction mode encoding value plus 1 is the value of the intra-frame prediction mode;
   if the prediction mode encoding value is greater than or equal to values of only two of the three reference prediction modes, determine that a result of the prediction mode encoding value plus 2 is the value of the intra-frame prediction mode; and
   if the prediction mode encoding value is greater than or equal to values of the three reference prediction modes, determine that a result of the prediction mode encoding value plus 3 is the value of the intra-frame prediction mode.

39. The decoding method according to claim 35, wherein intra-frame prediction modes of current intra-frame decoding blocks of different sizes come from the same prediction mode set, and all prediction modes in the backup reference mode set belong to the prediction mode set.

* * * * *